United States Patent [19]
Bingham

[11] 3,807,776
[45] Apr. 30, 1974

[54] COUPLING COLLET AND GLAND FOR METAL TO PLASTIC CONDUIT

[76] Inventor: Loran S. Bingham, 505 Boccaccio St., Venice, Calif. 90291

[22] Filed: May 21, 1971

[21] Appl. No.: 145,756

[52] U.S. Cl.............. 285/174, 285/238, 285/323, 285/339, 285/DIG. 16
[51] Int. Cl............................................ F16l 47/02
[58] Field of Search .......... 285/174, 238, 284, 323, 285/339, 342, 343, 369, 417, 421, 423, DIG. 16

[56] References Cited
UNITED STATES PATENTS

| | | | |
|---|---|---|---|
| 3,701,548 | 10/1972 | McGuire................. | 285/DIG. 16 X |
| 3,265,412 | 8/1966 | Reid et al. ........................ | 285/323 |
| 2,998,269 | 8/1961 | Houghton ..................... | 285/339 X |
| 987,683 | 3/1911 | Allan .................................. | 285/339 |
| 3,245,701 | 4/1966 | Leopold, Jr. et al. ............. | 285/174 |

FOREIGN PATENTS OR APPLICATIONS

| | | | |
|---|---|---|---|
| 704,839 | 2/1931 | France................................. | 285/323 |
| 1,115,104 | 12/1955 | France......................... | 285/DIG. 16 |

Primary Examiner—Mervin Stein
Assistant Examiner—David H. Corbin
Attorney, Agent, or Firm—William H. Maxwell

[57] ABSTRACT

A coupling for the interconnection of metal to plastic tubular members and especially electrical conduit, wherein mechanical connection to the metal member is effected by the gripping action of collet means and wherein the mechanical connection to the plastic member is effected by both said collet means and by fusion or adhesion. The said mechanical connection to the metal member is enhanced through adhesive action, and a seal between the metal member and plastic member is effected by the compressive action of said collet means which affects a gland means to perform its sealing function.

8 Claims, 4 Drawing Figures

PATENTED APR 30 1974 3,807,776
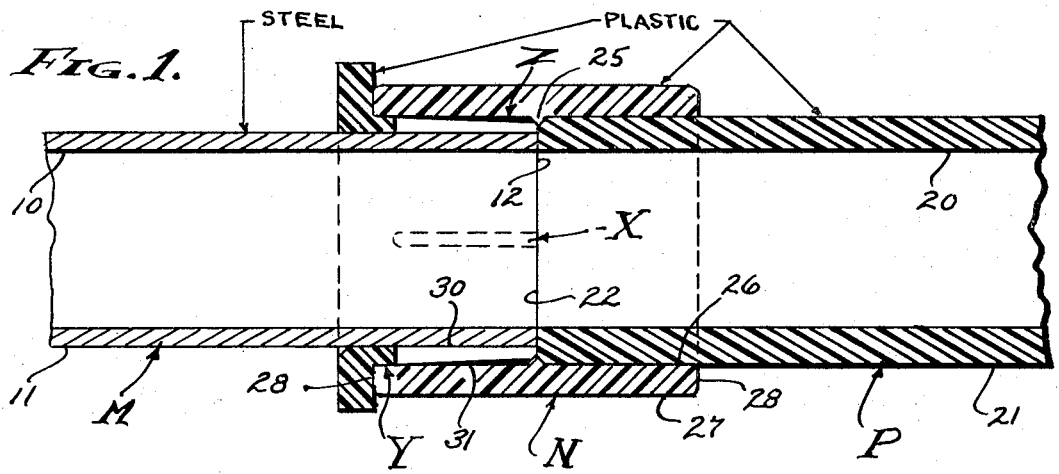
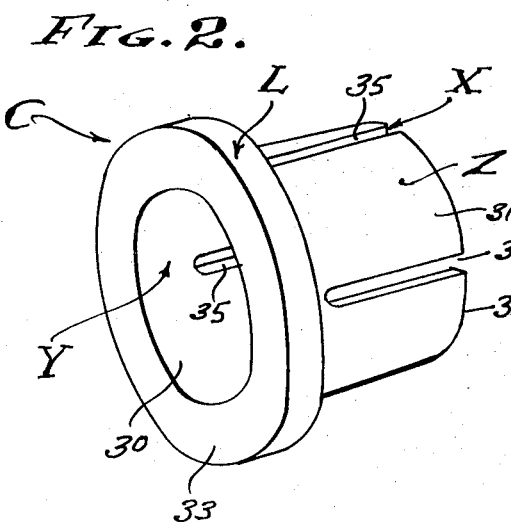 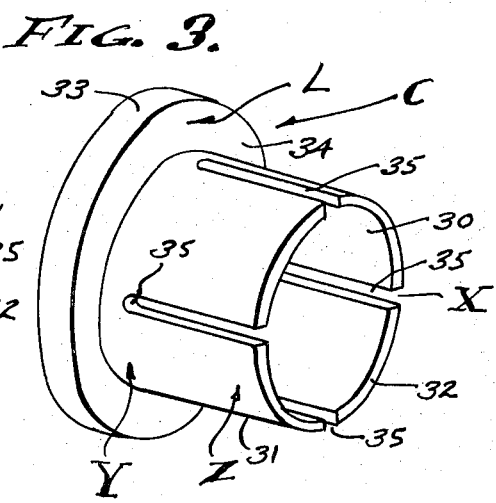
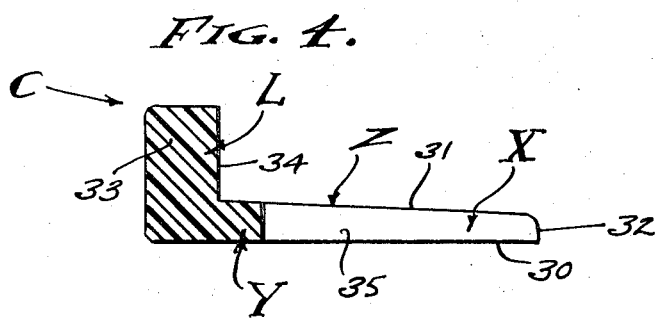
INVENTOR
LORAN S. BINGHAM
By
W. H. Maxwell

COUPLING COLLET AND GLAND FOR METAL TO PLASTIC CONDUIT

BACKGROUND

The prior art provides both metal tubing and plastic tubing for use as electrical conduit, and each with its special connections and fittings. Each tubing material has its accepted applications and it is often required that metal tubing be joined with plastic tubing, in which case "special fittings" have been required in order to make the transition. These said special fittings are usually in the form of threaded unions which accommodate the diameters of the two members to be coupled as is determined by the wall thicknesses thereof respectively. That is, the wall thickness of a steel tube is usually less than that of a plastic tube in order to provide equivalent strength; and it is normal that the inner diameter is controlling and substantially the same in each instance. Therefore, the discrepancy in diameter occurs between the exterior diameters of the two tube members, and which discrepancy is advantageously employed as hereinafter described.

FIELD OF INVENTION

This invention relates to the coupling together of dissimilar materials in tube form, it being an object to provide for mechanical and sealed joinder between metallic and plastic tubing or the like.

An object of the invention is to couple metallic tubing to plastic tubing by means of radial compression in lieu of threading, thereby facilitating manufacture and assembly.

Another object of the invention is to seal metallic tubing to plastic tubing by means of radial compression in lieu of dressings applied to threaded connections.

It is still another object of the invention to provide a coupling and seal of the type thus far referred to that advantageously employs a bonding material and preferably a solvent which fuses all involved elements and members to be interconnected.

SUMMARY OF INVENTION

The Coupling Collet and Gland of the present invention is a plastic article formed as by the process of injection molding and comprises a single body of substantially rigid plastic such as polyvinylchloride incorporating therein; collet means, gland means, compression means and locating means; said coupling collet and gland being operable with and between tube members of dissimilar material, one of complementary plastic material and the other of metallic material, and in combination with a cylindrical collar carried on one member of larger diameter and projecting over the other member in spaced relation thereto in order to receive the said coupling collet and gland in the annulus formed therebetween.

DRAWINGS

The various objects and features of this invention will be fully understood from the following detailed description of the typical preferred form and application thereof, throughout which description reference is made to the accompanying drawings, in which:

FIG. 1 is a longitudinal sectional view taken through the coupling collet in its installed position connecting abutting sections of metal and plastic conduit. FIG. 2 is a perspective view of the coupling collet taken from one end and side thereof. FIG. 3 is a perspective view of the coupling collet taken from the other end and side thereof. And, FIG. 4 is an enlarged detailed sectional view of the perimeter of the coupling collet.

PREFERRED EMBODIMENT

Referring now to the drawings, the present invention avoids the use of threaded couplings and/or adapters which are time consuming to install and provides to better advantage a press-together assembly that mechanically couples tube elements of dissimilar materials and consequently of different dimensions, and that seals the two members at the joinder therebetween. With the wide use of plastic pipe and/or conduit there is the necessary requirement of sealed joinder thereof to metal pipe and/or conduit. Heretofore, such joinder has been made by means of adapters threadedly engaged onto the metal member and telescopically receiving the plastic member which is fused therewith with the application of a solvent that welds the interface engagement. In accordance with the present invention the metallic tubing member M is coupled to the plastic tubing member P by means of a straight nipple N of plastic tube form as distinguished from a threaded metallic pipe form, and a collet and gland C is cooperatively disposed between the tubing member M and nipple N in the presence of a solvent or adhesive and acting to mechanically couple and seal the two said tubing members.

The metallic tubing member M is the pipe or conduit to which the plastic tubing member P is to be coupled, and being of a basically stronger material than plastic the member M is of thinner walled construction. Since it is the inside diameter which determines the cross sectional capacity of these tubing members, said diameter is maintained in both members respectively and it is the outside diameter of the plastic tubing member P which is greater than that of the member M. Generally, the metallic tubing member M is made of steel having inner and outer diameter walls 10 and 11, and in accordance with the present invention the terminal end 12 thereof is cut off at a normal angle (no threading or swedging processes).

The plastic tubing member has inner and outer diameter walls 20 and 21, and the terminal end 22 thereof is cut off at a normal angle (no other preparation) in order to abut against the terminal end 12 of member M. The inner diameter walls 10 and 20 are substantially the same diameter, one aligned with the other so as to establish a continuous passageway; while the larger outside diameter of the plastic tubing member presents a shoulder facing the tubing member M.

The nipple N is also and/or preferably of plastic material and with one section telescopically engaged over the end portion of tubing member P and stopped by an interior flange 25 that engages the end 22, and with the other section projecting concentrically over the end portion of the end portion of said tubing member M so as to be stopped by the flange 25. As shown, the nipple is of the same wall thickness as the tubing member P (approximately so) having inner and outer diameter walls 26 and 27 and opposite ends 28 normal thereto. Thus, an annulus of right cylinder form is established between the outer diameter wall 11 of the member M and the inner diameter wall 26 of nipple N. In practice, the plastic tubing member P and nipple N are made of polyvinychloride and the sliding fit of one over the other establishes an interface that is fused together by means of a solvent.

In accordance with this invention, I provide the Coupling Collet and Gland C which mechanically joins and seals the plastic tubing member P and nipple N with the metallic tubing member M in an integral article of manufacture made of complementary plastic material and comprising; collet means X, gland means Y, compression means Z and locating means L, and all of which are integrally formed of a single body of material and cooperatively related to perform the interrelated functions as defined by said means.

The collet means X is an axial extension of the gland means Y from which it projects, while the locating means L is a radial extension of said gland means Y; and the compression means Z is incorporated so as to apply radial compression to both the collet means X and to the gland means Y. To these ends the Coupling Collet and Gland C involves an inner diameter wall 30 slideably engageable over the outer diameter wall 11 of the tubular member M and an outer diameter wall 31 slideably engageable into the inner diameter wall 26 of the nipple N. The right cylinder form has a normal inner end 32 to closely approach flange 25, and it has a radial flange 33 at its outer end with an inwardly faced wall 34 to engageably stop against the end 28 of nipple N. The said right cylinder is sectional, both sections underlying (partially at least) the nipple N, and the inner section being slotted at 35 thereby establishing independently radially movable fingers of collet form.

The gland means Y is formed by the outer section from which the collet fingers project, it being significant that inward pressure and/or bending of the collet fingers turns the inner end of the gland section inwardly into tightened engagement with the outer diameter wall of the tubular member M.

The compression means Z is formed by a taper in the outer diameter wall 31, tapered inwardly from the flange wall 34 to the inner end 32; the base of the taper at wall 34 being of larger diameter than the initial inner diameter of the nipple wall 36. It is to be understood that the collet wall is supported from within by the outer diameter wall of member M and that the nipple N is radially expansible, and therefore the taper of outer diameter wall 34 expands the nipple to have coextensive interface engagement therewith.

The assembly and inherently effective operation of the several means hereinabove described is accomplished by wetting the Coupling Collet and Gland C (also made of polyvinylchloride) with solvent, followed by forcing the tubular members M and P into abutted engagement with the flange 33 urged into stopped engagement with the end 28 of the nipple. The taper of compression means Z applies radial compression to the interface engagements between both the tubing member M and nipple N and when the plastic material solidifies and is fused between the interface engagements between nipple N and tubular member M and is mechanically held to its adhesive engagement.

Having described only a typical preferred form and application of my invention, I do not wish to be limited or restricted to the specific details herein set forth, but wish to reserve to myself any modifications or variations that may appear to those skilled in the art:

I claim:

1. A coupling for joining a solvent-weldable plastic tubular member in abutting alignment with a like tubular member if dissimilar non solvent-weldable material and including; a nipple of solvent-weldable plastic slideably engaged onto the exterior diameter wall of the tubular member of solvent-weldable plastic and sealed and secured thereto by means of applied solvent and projecting therefrom to form a smooth inner diameter bore, a sleeve of solvent-weldable plastic and of right cylinder form slideable over the end portion of the like tubular member of dissimilar material and having a radially compressible section with a tapered cylinder wall wedgedly engageable into said smooth bore within the terminal end portion of said nipple and applying radial force between and mechanically sealed with said nipple and with said like tubular member of dissimilar material and held by means of applied solvent in the interfaces therebetween to weld said sleeve in the nipple for maintaining radial force and to seal and secure the tubular members of dissimilar material.

2. The coupling as set forth in claim 1, wherein the sleeve is longitudinally slotted to form said radially compressible section.

3. The coupling as set forth in claim 1, wherein the inner end of the sleeve is longitudinally slotted next adjacent to a circumferentially intact portion forming said radially compressible section adjoining a gland means engaged between said nipple and said other member to seal therewith.

4. The coupling as set forth in claim 1, wherein the outer diameter wall of the sleeve is tapered radially inward from a base at its outer end diameter which is greater than the inner diameter wall of the nipple bore into which it is forcible.

5. The coupling as set forth in claim 1, wherein a stop flange projects radially from the outer end of the sleeve forming a locating means engageable with the end of the nipple.

6. The coupling as set forth in claim 1, wherein a stop flange projects radially from the outer end of the sleeve forming a locating means engageable with the end of the nipple, and wherein the inner end portion of the sleeve is longitudinally slotted to form said radially compressible section.

7. The coupling as set forth in claim 1, wherein the outer portion of the sleeve is circumferentially intact to form a gland means engaged between said nipple and said other member to seal therewith.

8. The coupling as set forth in claim 1, wherein the outer diameter wall of the sleeve is tapered radially inward from a base at its outer end diameter which is greater than the inner diameter wall of the nipple bore into which it is forcible, wherein a stop flange projects radially from the outer end of the sleeve forming a locating means engageable with the end of the nipple, wherein the inner end portion of the sleeve is longitudinally slotted to form said radially compressible section, and wherein the outer portion of the sleeve is circumferentially intact to form a gland means engaged between the terminal end portion of said nipple and said other member to seal therewith.

* * * * *